United States Patent [19]

Linville, Jr.

[11] Patent Number: 4,483,047

[45] Date of Patent: Nov. 20, 1984

[54] PRODUCT SORTER UTILIZING A CONSTANT PERCENTILE WEIGHT DISTRIBUTION

[76] Inventor: Richard D. Linville, Jr., 1302 First Ave., Sterling, Ill. 61081

[21] Appl. No.: 443,210

[22] Filed: Nov. 22, 1982

[51] Int. Cl.³ .......................................... A22C 21/00
[52] U.S. Cl. ........................................ 17/45; 17/11; 364/478; 364/567; 209/596
[58] Field of Search ........ 209/557, 559, 560, 572–576, 209/645; 364/567–568, 579, 478, 575; 198/504, 505; 17/45, 11; 177/50

[56] References Cited

U.S. PATENT DOCUMENTS

| | | | |
|---|---|---|---|
| 3,291,303 | 12/1966 | Altenpohl, Jr. | 209/595 X |
| 3,497,684 | 2/1970 | McKieman | 364/579 X |
| 3,613,808 | 10/1971 | Bonelle | 209/593 X |
| 3,875,383 | 4/1975 | Somerville et al. | 364/567 X |
| 3,983,376 | 9/1976 | Pozzetti | 364/563 X |
| 4,239,434 | 12/1980 | Gannon | 198/504 X |

Primary Examiner—Randolph Reese
Assistant Examiner—Glenn B. Foster
Attorney, Agent, or Firm—Edmond T. Patnaude

[57] ABSTRACT

The birds to be processed in a poultry processing plant are individually weighed and subsequently sorted into respective weight categories of either over or under a calculated reference weight which varies with the weights of a number of the lastweighed birds in a base sample to maintain the numbers of birds being currently sorted into the two categories substantially equal.

14 Claims, 4 Drawing Figures

PRODUCT SORTER UTILIZING A CONSTANT PERCENTILE WEIGHT DISTRIBUTION

The present invention relates in general to systems for processing products of differing weights and sizes and it relates in particular to a novel method and apparatus for sorting the products into a plurality of size or weight categories to optimize the operating efficiency of the succeeding processing system.

BACKGROUND OF THE INVENTION

The equipment used in the automatic processing of certain products functions most efficiently when the products are within a particular size or weight range. In addition, certain parameters such as optimum processing times and temperatures are related to the weight or size of the individual product items being treated. For example, in a poultry processing plant the eviscerating devices are preferably sized to the sizes of the birds being processed so as to remove all of the entrails without damaging the carcasses. Similarly, the optimum dwell period in the chiller tanks is longer for larger birds than for smaller birds.

When processing natural items such as meat carcasses, vegetables, fruits and the like, the individual items are not identical and may vary in size and weight over a considerable range. It has been the practice to utilize apparatus and parameters which provide an acceptable end product without an excessive number of rejects. Greater efficiency would be achieved, however, if the equipment and parameters were related to a narrow size or weight range. For example, two processing lines could be provided, with one line operating most efficiently with relatively small birds and the other line operating most efficiently with relatively large birds.

When processing certain products as, for example, poultry, the average sizes of the birds frequently vary appreciably from one flock to the next, and if the birds were to be sorted with respect to an average or mean size of bird processed over an extended period of time, there would be periods when all of the birds would fall in either the small or large category. If, therefore, separate lines were provided for respectively processing bird carcasses over and under a given size, one such line might be handling most of the carcasses from a given flock being processed while the other line might be virtually empty, and that would be less efficient than the present system of processing all sizes of birds on the same line. It would be desirable, however, to sort the birds being processed at any given time into different size categories for processing on different lines so as to utilize both lines at all times while still using one line primarily for processing small birds and using the other line primarily for processing large birds.

There would be other advantages resulting from the sorting of the birds into two or more sizes and processing the different sized birds on different lines. For example, in a typical processing plant some of the birds are cut up for sale as separate pieces while the others are sold whole. Considerable cost savings would result from cutting up only the larger birds since the labor cost is the same for cutting up both large and small birds yet the overall price differential for cut-up large birds is greater than the price differential for cut-up small birds. Therefore, it would be desirable to cut up only the large birds, provided, of course, that a continuous supply of birds to the cut-up station was provided even though a flock of smaller birds was being processed.

SUMMARY OF THE INVENTION

Briefly, there is provided in accordance with the present invention a method and system for sorting products into a plurality of categories to maintain the number of products currently being sorted into each category with a predetermined relationship to one another, say one to one, irrespective of variations in the products being sorted. Although the invention finds application in many different fields, it is described herein as embodied in a poultry processing system having a plurality of processing lines.

In a preferred embodiment of the invention the birds to be processed are automatically weighed and sorted into two categories, light and heavy, as they are dropped from the conveyor shackles following the plucking and hock removal operations. The sorted birds are then respectively loaded onto two processing lines so that the light birds are processed on one line and the heavy birds are processed on the other line. As explained in greater detail hereinafter, the birds are sorted so that the total numbers of birds sorted into the heavy and light categories within a relatively short time, say four minutes, is also substantially equal irrespective of wide variations in the average or mean weights of birds being processed.

In accordance with one aspect of the invention the birds are individually weighed and then sorted in accordance with their respective relationships to the average weight of the last one-hundred birds weighed. The base number of one-hundred is not critical, but the base number should be sufficiently large so that the average weight thereof is not significantly affected by one or two unusually light or heavy birds or by the inadvertent weighing of two birds at one time. On the other hand, the base number should not be so high that a large number of successively weighed birds fall in the same category wherefor one processing line would be substantially devoid of birds to be processed. For a modern chicken processing plant, the base number of one-hundred has been found to maintain both the large and small bird processing lines substantially full at all times while holding the numbers of birds in the two categories within a few birds per day.

In order to sort the birds in accordance with the present invention, those birds weighing more than a continuously calculated reference weight, herein referred to as the split weight, are separated from the birds weighing less than a continuously calculated split weight. The split weight may be calculated by use of the following equation:

$$K(N_H - N_L) + (W_B/N_B) = \text{split weight}$$

where:

$N_H$ = number of birds previously sorted during the day or other period which weighed more than the split weight.

$N_L$ = number of birds previously sorted during the day or other period which weighed less than the split weight.

$W_B$ = total weight of the birds in the last base sample of birds sorted.

$N_B$ = number of birds in the last base sample of birds sorted.

$K$ = rate of correction coefficient.

The value of K will vary with the demands of the process. The larger the value of K relative to the average weight of the product being sorted the quicker will be the correction. For example, when processing chickens having an approximate weight of three and one-half to four and one-half pounds, K may have a value between about 0.005 and 0.2, with 0.01 having been found to maintain the numbers of birds sorted into each of two weight categories within a few birds in an eight hour shift while providing a substantially continuous flow of birds to both lines. In the case of turkeys having an average weight between twelve and twenty-five pounds, a value of K in the range of 0.025 and 0.1 will provide satisfactory results, i.e., the numbers of birds in the light and heavy categories will remain about equal, and there will be no long periods where all birds will be sorted in either category.

It may thus be seen that if the number of previously sorted heavy birds is less than the number of previously sorted light birds, the calculated split weight will be less than the average weight of the birds in the base sample wherefor more of the birds being sorted will fall into a heavy category. In like manner, if the number of sorted light birds is less than the number of sorted heavy birds, the split weight will be greater than the average weight and more of the birds being sorted will fall into the light cateogry. Accordingly, the smaller birds will be placed in one category and the larger birds will be placed in the other category, but there will be no appreciable time when a substantial number of successively weighed birds will go into the same category.

The above equation can be modified to substitute the last split weight calculated for the average weight in the base sample, wherefor the equation will be $$K(N_H - N_L) + W_S = \text{split weight}$$

where $W_S$ is the split weight which was calculated using the weight of the preceding bird.

The number of birds in each of the two or more categories need not be equal, and in that case a different equation may be used.

$$(Npl - Nal) K + W_S = \text{split weight}.$$

Npl = desired number of birds sorted into the light category.
Nal = actual number of birds sorted into the light category.
$W_S$ = last split weight calculated.

This equation may of course, be used where the desired numbers of birds in the two categories are equal. Moreover, the average weight of the birds in a preceding sample may be substituted in this equation for $W_S$. Also, the predicted number and actual number of birds sorted into the heavy category rather than the light category may be used in this equation.

In accordance with another aspect of the invention two or more split weights may be calculated in the above manner to sort the product into three or more categories. For example, assume that it is desired that the lightest forty percent of the birds go into one category, the next heaviest forty percent go into another category and the heaviest twenty percent go into a third category. Then, in the above equation Npl will equal forty percent of the total birds which have been sorted and Nal will equal the number of birds which have been actually sorted into the light category to provide the first split weight. A second split weight is also calculated wherein Npl will equal 80% of the total birds sorted and Nal will equal the total number of birds which have been actually sorted into the light and intermediate categories. It will thus be seen that if the bird being weighed is less than the calculated first split weight, it will be sorted into the light category. If the bird being weighed is more than the calculated first split weight but less than the calculated second split weight it will be sorted into the second category. Otherwise, it will be sorted into the third or heaviest category. It may thus be seen that the birds may be sorted into any number of categories and with any desired percentage of birds going into each of these categories.

In an automatic bird carcass distribution system embodying the present invention for sorting birds into two categories, the carcasses are released one after another from the shackles of an overhead conveyor following the picking and hock removal operations. They then fall onto a slide and move seriatim under the force of gravity across a weighing platform. The carcasses are individually weighed as they travel across the weighing platform and depending on their respective weights being greater or less than the continuously calculated split weight they are diverted by a microprocessor-controlled deflector onto one side or the other of a conveyor belt. A longitudinally extending partition separates the two sides of the conveyor belt from which the carcasses are supplied to two separate loading stations. At the loading stations the sorted carcasses are manually loaded onto the shackles of two separate overhead conveyors which carry them through the eviscerating stations to the cooling stations, the heavy carcasses being loaded onto one conveyor and the light carcasses being loaded onto the other conveyor.

GENERAL DESCRIPTION OF THE DRAWING

The present invention will be better understood by a reading of the following detailed description taken in connection with the accompanying drawing wherein.

DETAILED DESCRIPTION OF A PREFERRED EMBODIMENT OF THE INVENTION

Figure 1:
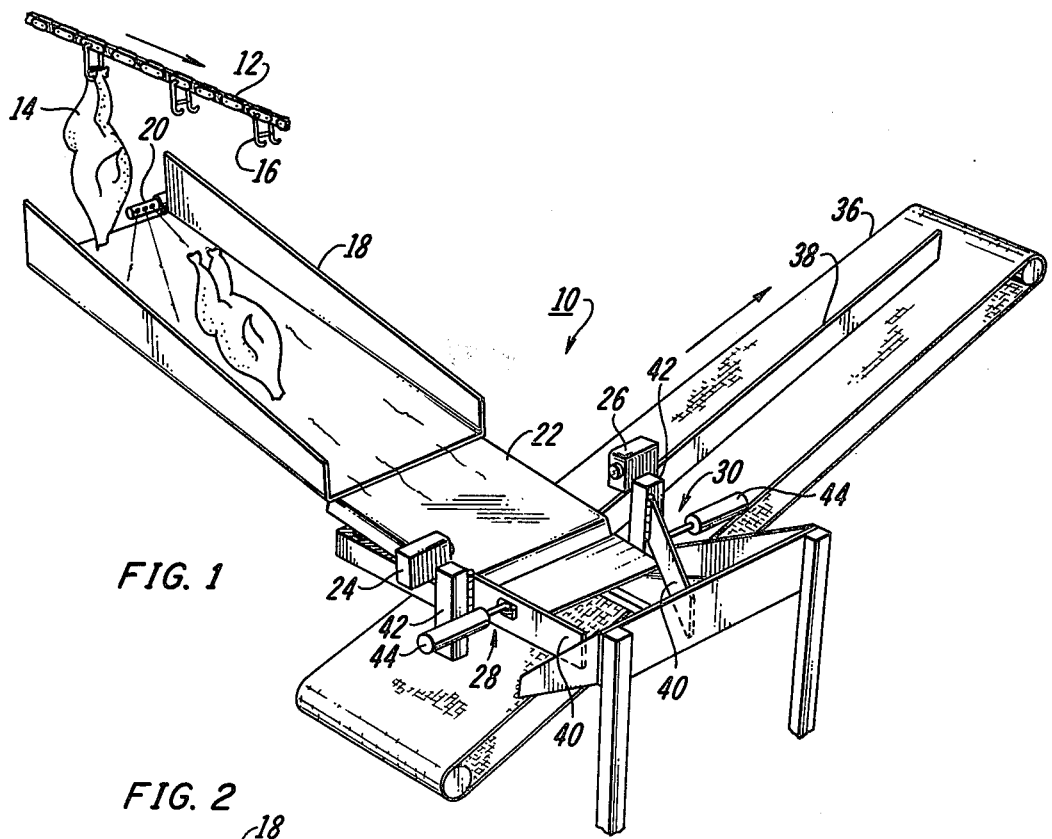
FIG. 1 is a perspective view of a poultry sorter embodying the invention.
Figure 2:
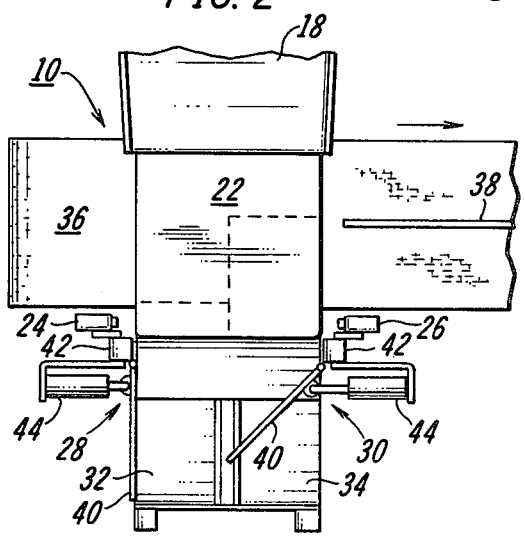
FIG. 2 is a plan view of the weighing and sorting stations in the sorter of FIG. 1.
Figure 3:
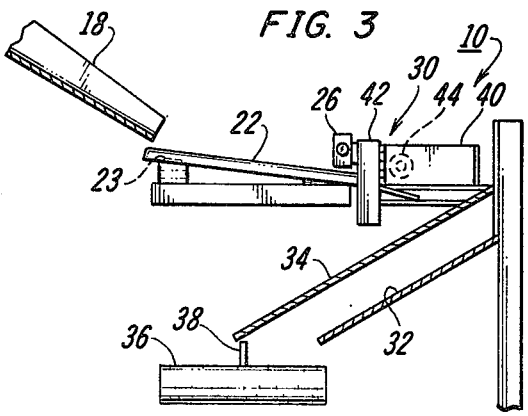
FIG. 3 is an elevational view of the weighing and sorting stations in the sorter of FIG. 1.

Referring particularly to FIGS. 1, 2 and 3, a weighing and sorting device 10 is located below an overhead conveyor 12 which carries a plurality of birds 14 on respective ones of a plurality of shackles 16. The birds 14 may have been plucked and dehocked before reaching the weighing and sorting station. However, in its broader aspects the invention is applicable to the weighing and sorting of live birds or any other products into a pluraltiy of categories.

Figure 4:
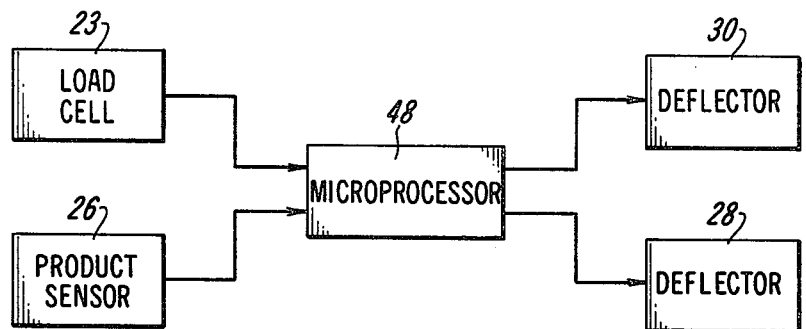
FIG. 4 is a block diagram of a sorting system embodying the present invention.

As the birds move over a chute 18, they are automatically dropped from the shackles 16 seriatim in any of the well known ways such, for example, as by knock-off devices or by other suitable drop mechanisms. If desired, water may be sprayed onto the chute 18 from a nozzle 20 so that the birds slide more freely down the chute and across a weigh platform 22. The birds are thus individually weighed by a load cell 23 (FIG. 4) on which the platform 22 is suspended and then break the light beam which is directed from a light source 24 onto a sensor 26. After leaving the weigh platform 22 the birds are deflected by one or the other of a pair of pivotally mounted deflectors 28 and 30 onto a respective one of a pair of chutes 32 and 34. The lower ends of the chutes 32 and 34 are disposed above opposite sides of a continuously traveling conveyor belt 36 which carries the birds to another operating station (not shown). A fixed partition 38 extends longitudinally along the conveyor belt 36 to maintain the birds in the sorted categories as they travel along the conveyor 36.

The deflectors 28 and 30 may be of any suitable type which will operate at the speed required to deflect the birds into the selected chute 32, 34 after they have been weighed. In a commercial embodiment of the invention designed to weigh and sort poultry carcasses at rates exceeding one-hundred twenty birds per minute the deflectors each comprised a metal vane or paddle 40 hingedly mounted to an upright post 42 and moved between a retracted position and an extended position by a pneumatic piston-cylinder 44. The deflector 28 is shown in the retracted position in the drawing and the deflector 30 is shown in the extended position. It may be seen that when the deflectors are in these positions the bird will be directed into the chute 32 and thus travel along the right hand side of the conveyor 36 as it is viewed in FIGS. 2 and 3. By using two deflectors rather than one the angular movement of each deflector is less, wherefor higher operating speeds can be achieved.

OPERATION

Although any suitable weighing system may be used, in order to provide accurate weight measurements, the output signal from the load cell is continuously applied to a microprocessor 48 which interrogates the load cell several times while a bird is passing across the weigh platform 22 and temporarily stores these weight measurements. When the bird is then sensed by the sensor 26, the microprocessor 48 averages the last three, four or more weight measurements, performs the calculation described hereinabove and provides the necessary output signals to the control valves of the deflectors 28 and 30 to sort the bird into the proper category. For example, those birds which weigh more than the calculated split weight will be deflected by the deflector 28 onto the chute 34 while those birds weighing less than the calculated split weight will be deflected by the deflectors 30 into the chute 32.

In the preferred embodiment of the invention shown in the drawing, two individually operated deflectors are used to direct the birds to one or the other of two separate processing lines. If desired, however, the two deflectors can be used to direct the birds to three or more processing lines. For example, four separate processing lines may be supplied from the same weigher-sorter with twenty-five percent of the birds being directed to each line on the basis of three intermediate split-weights continuously calculated and updated.

The sorting mechanism shown in FIGS. 1, 2 and 3 may, of course, be used with control systems using a pre-settable, fixed reference or split weight. Such a system is useful in sorting male from female turkeys wherein the weight ranges of the males and females do not overlap.

The percentage of birds to be sorted into each category need not be fixed, but may be automatically and continuously adjusted in response to changes in operating conditions of the associated processing system. For example, in a typical poultry processing plant having one picking line feeding three eviscerating lines the speeds of the eviscerating lines may normally run at the same speed, but for various reasons such as conveyor line malfunction or mandatory inspection slow downs the relative conveyor line speeds may change. Consequently, the percentages of birds directed to the three lines should also change, and these new percentages can be automatically entered into the microprocessor 48 by pulse feedback or rate feedback signals from the individual eviscerating line drives.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A method of processing a plurality of products which vary in weight with respect to one another, comprising the steps of
   weighing said products individually,
   comparing the weight of each weighed product with a split weight
   separating the lighter products having a weight less than said split weight from the heavier products,
   processing the lighter products separately from the heavier products,
   varying the split weight to maintain the numbers of said lighter and heavier products in a substantially constant predetermined ratio,
   said split weight being related to the number of previously weighed products which were lighter than said split weight, and the number of previously weighed products which were heavier than said split weight.

2. A method of processing according to claim 1, wherein said split weight is calculated using the following equation:

$$K(N_H - N_L) + (W_B/N_B) = \text{split weight}$$

where
$N_H$ = number of birds previously sorted during the day or other period which weighed more than the split weight
$N_L$ = number of birds previously sorted during the day or other period which weighed less than the split weight
$W_B$ = total weight of the birds in the last base sample of birds sorted
$N_B$ = number of birds in the last base sample of birds sorted
$K$ = rate of correction coefficient.

3. A method of processing according to claim 2 wherein said products are birds and
said base number is one-hundred.

4. A method of processing according to claim 3 wherein
said birds are eviscerated after said weighing and separating steps.

5. In a system for processing a plurality of products which vary in weight, comprising
first and second processing lines for said products, means for weighing the products to be processed and for supplying to said first processing line only those products which weigh less than a split weight and for supplying to said second processing line only those products which weigh more than said split weight, and means responsive to the weights of said products and the relative numbers of previously weighed products which were lighter and heavier than said split weight for calculating said split weight to maintain the ratio of the number of products supplied to said first processing line to the number of products supplied to said second processing line substantially constant at all times.

6. In a system for processing a plurality of birds which vary in weight, comprising weighing means across which said birds individually travel for providing weight related output signals respectively representative of the weight of each bird traveling thereacross, sorting means disposed to intercept said birds after they have traveled across said weighing means for directing said birds to a selected one of a plurality of locations, and computer means responsive to said output signals for controlling said sorting means to maintain the numbers of birds supplied to said locations in a predetermined ratio with the heavier birds being directed to one of said locations and the lighter birds being directed to another of said locations.

7. In a system according to claim 6, first conveyor means from which said birds are dropped seriatem, and chute means disposed below said first conveyor means for intercepting said birds as they are dropped from said first conveyor means and for directing said birds across said weighing means.

8. In a system according to claim 7 wherein said birds move under the force of gravity across said weighing means.

9. In a system according to claim 6 wherein said computer means controls said sorting means to direct those birds weighing less than a calculated split weight to said one of said locations and to direct those birds weighing more than said calculated split weight to said another of said locations, said calculated split weight being related to the average weight of the last predetermined number of birds weighed and the relative numbers thereof which were directed to said one of said locations and to said another of said locations.

10. In a system according to claim 6 wherein said computer means controls said sorting means to direct those birds weighing less than a calculated split weight to said one of said locations and to direct those birds weighing more than said calculated split weight to another of said locations, said calculated split weight being calculated in accordance with the following equation:

$$(Npl - Nal) K + W_S = \text{split weight}$$

$Npl$ = desired number of birds sorted into the light category $Nal$ = actual number of birds sorted into the light category $W_S$ = last split weight calculated $K$ = rate of correction coefficient.

11. The combination as set forth in claim 6 wherein said sorting means comprises a plurality of deflector vanes hingedly mounted adjacent said weighing means, and pneumatic piston-cylinder means operatively connected to said deflector means for swinging said vanes between predetermined deflecting positions.

12. The combination as set forth in claim 11 wherein said piston-cylinder means comprises a plurality of pneumatic piston-cylinders respectively connected to said vanes for separately and independently swinging said vanes.

13. A method of processing according to claim 1, wherein said split weight is continually corrected by comparing the number of items previously sorted which weighed more than the split weight with the number of items previously sorted which weighed less than the split weight and using the difference between said number to vary the split weight to control the percentage split between thosee that weigh more and those that weigh less than the split weight at each preceding time of comparison.

14. In a system according to claim 6 wherein said computer means controls said sorting means to direct those birds weighing less than a calculated split weight to said one of said locations and to direct those birds weighing more than said calculated split weight to another of said locations, said calculated split weight being calculated by comparing the number of birds previously sorted which weighed more than the split weight with the number of birds previously sorted which weighed less than the split weight, and multiplying the difference by a rate of correction coefficient.

* * * * *